(12) United States Patent
Jin et al.

(10) Patent No.: US 10,304,406 B2
(45) Date of Patent: May 28, 2019

(54) DISPLAY APPARATUS WITH REDUCED FLASH NOISE, AND A METHOD OF DRIVING THE DISPLAY APPARATUS

(71) Applicant: SAMSUNG DISPLAY CO., LTD., Yongin-si, Gyeonggi-Do (KR)

(72) Inventors: Jeong-Oh Jin, Hwaseong-si (KR); Hyeok-Tae Kwon, Yongin-si (KR); Dongkeon Kim, Busan (KR); Seonhye Kim, Bucheon-si (KR); Se-Won Min, Asan-si (KR); Hyunjung Son, Asan-si (KR); Utah Choi, Hwaseong-si (KR)

(73) Assignee: SAMSUNG DISPLAY CO., Ltd., Yongin-si, Gyeonggi-Do (KR)

( * ) Notice: Subject to any disclaimer, the term of this patent is extended or adjusted under 35 U.S.C. 154(b) by 117 days.

(21) Appl. No.: 15/380,322

(22) Filed: Dec. 15, 2016

(65) Prior Publication Data
US 2017/0178587 A1    Jun. 22, 2017

(30) Foreign Application Priority Data

Dec. 16, 2015 (KR) .......................... 10-2015-0180335

(51) Int. Cl.
*G09G 3/36* (2006.01)
*G02F 1/1343* (2006.01)
(Continued)

(52) U.S. Cl.
CPC ......... *G09G 3/3696* (2013.01); *G02F 1/1368* (2013.01); *G02F 1/134363* (2013.01);
(Continued)

(58) Field of Classification Search
CPC ................................. G09G 2310/0245; G09G 2330/026–2330/027
See application file for complete search history.

(56) References Cited

U.S. PATENT DOCUMENTS

2006/0132409 A1* 6/2006 Chen .................... G09G 3/3648 345/89
2008/0165109 A1* 7/2008 Joo ....................... G09G 3/3677 345/98

(Continued)

FOREIGN PATENT DOCUMENTS

| KR | 1020100022733 | 3/2010 |
| KR | 1020130119343 | 10/2013 |
| KR | 1020140134104 | 11/2014 |

*Primary Examiner* — Laurence J Lee
(74) *Attorney, Agent, or Firm* — F. Chau & Associates, LLC (57) ABSTRACT

A display apparatus includes a display panel including a switching element connected to a data line and a gate line, a pixel electrode connected to the switching element, a common electrode facing the pixel electrode and a liquid crystal layer disposed between the pixel electrode and the common electrode. The display apparatus further includes a data driving circuit configured to convert image data to a data voltage. The display apparatus further includes a driving voltage generator configured to generate a common voltage, in response to a voltage control signal from a timing controller, to the common electrode and the data driving circuit, which is configured to output the common voltage to the pixel electrode during an initial setting period when power is turned on to the display apparatus.

19 Claims, 8 Drawing Sheets

(51) Int. Cl.
*G02F 1/1362* (2006.01)
*G02F 1/1368* (2006.01)

(52) U.S. Cl.
CPC ..... *G02F 1/136286* (2013.01); *G09G 3/3688* (2013.01); *G02F 2201/121* (2013.01); *G02F 2201/123* (2013.01); *G02F 2203/64* (2013.01); *G09G 2310/0245* (2013.01); *G09G 2310/0289* (2013.01); *G09G 2310/08* (2013.01); *G09G 2330/026* (2013.01)

(56) References Cited

U.S. PATENT DOCUMENTS

| | | | | |
|---|---|---|---|---|
| 2009/0115772 A1* | 5/2009 | Shiomi | ............... | G09G 3/342 345/214 |
| 2011/0074751 A1* | 3/2011 | Jiang | ............... | G09G 3/3611 345/207 |
| 2012/0106700 A1* | 5/2012 | Jung | ............... | G03B 42/02 378/62 |
| 2013/0076713 A1* | 3/2013 | Kim | ............... | G09G 3/34 345/208 |
| 2015/0277170 A1* | 10/2015 | Hirao | ............... | G09G 3/3648 349/42 |
| 2016/0027394 A1* | 1/2016 | Yamamoto | ............... | G09G 3/3648 345/212 |
| 2016/0365056 A1* | 12/2016 | Sun | ............... | G09G 3/3648 |
| 2017/0148818 A1* | 5/2017 | Jia | ............... | G02F 1/136286 |

* cited by examiner

DISPLAY APPARATUS WITH REDUCED FLASH NOISE, AND A METHOD OF DRIVING THE DISPLAY APPARATUS

CROSS-REFERENCE TO RELATED APPLICATION

This application claims priority under 35 U.S.C. § 119 to Korean Patent Application No. 10-2015-0180335 filed on Dec. 16, 2015 in the Korean Intellectual Property Office, the disclosure of which is incorporated by reference herein in its entirety.

TECHNICAL FIELD

One or more exemplary embodiments of the present inventive concept relate to a display apparatus and a method of driving the display apparatus.

DISCUSSION OF THE RELATED ART

Generally, a liquid crystal display ("LCD") apparatus has a relatively small thickness, low weight and low power consumption. The LCD apparatus includes a LCD panel to display an image by using liquid crystal molecules to selectively transmit light emitted from a backlight assembly to the LCD panel. A driving circuit drives the LCD panel and thereby causes the selective transmittance of the light by the liquid crystal molecules.

The LCD panel includes an array substrate which has a plurality of gate lines, a plurality of crossing data lines, a plurality of thin film transistors and corresponding pixel electrodes. The LCD panel also includes an opposing substrate which includes a common electrode. The driving circuit includes a gate driver for driving the gate lines and a data driver for driving the data lines.

The LCD display panel may be driven in either a normally white mode which displays a white grayscale while a power is off or a normally black mode which displays a black grayscale while a power is off.

When the power is turned on, a common voltage is applied to a common electrode of the display panel. Thus, during a period in which a voltage of the common electrode is changed from a ground voltage to the common voltage, the display panel displays a random grayscale corresponding to a flash noise occurring from a backlight.

SUMMARY

According to an exemplary embodiment of the present inventive concept, a display apparatus includes a display panel including a switching element connected to a data line and a gate line, a pixel electrode connected to the switching element, a common electrode facing the pixel electrode and a liquid crystal layer disposed between the pixel electrode and the common electrode. The liquid crystal layer is driven by a difference in voltages between a voltage applied to the pixel electrode and a voltage applied to the common electrode. The display apparatus further includes a data driving circuit configured to convert image data to a data voltage. The display apparatus additionally includes a driving voltage generator configured to generate a common voltage applied to the common electrode and an analog source voltage applied to the data driving circuit. The display apparatus further includes a data switching circuit configured to output the common voltage to the data line during an initial setting period when power is turned on to the display apparatus.

In an exemplary embodiment of the present inventive concept, the common voltage is applied to the pixel electrode and the common electrode during the initial setting period.

In an exemplary embodiment of the present inventive concept, the common voltage is higher than a ground voltage and greater than or less than half of the analog source voltage.

In an exemplary embodiment of the present inventive concept, the display apparatus further includes a gate driver configured to output a gate signal to the gate line.

In an exemplary embodiment of the present inventive concept, the data switching circuit is configured to output the data voltage to the data line during a normal driving period after the initial setting period.

In an exemplary embodiment of the present inventive concept, the liquid crystal layer is driven in a normally black mode.

In an exemplary embodiment of the present inventive concept, the display panel includes a first base substrate, a second base substrate facing the first base substrate, and the common electrode and the pixel electrode are disposed on a same base substrate.

In an exemplary embodiment of the present inventive concept, either the common electrode or the pixel electrode includes a plurality of lines.

According to an exemplary embodiment of the present inventive concept, a display apparatus includes a display panel including a switching element connected to a data line and a gate line, a pixel electrode connected to the switching element, a common electrode facing the pixel electrode and a liquid crystal layer disposed between the pixel electrode and the common electrode. The liquid crystal layer driven by a difference in voltages between a voltage applied to the pixel electrode and a voltage applied to the common electrode. The display apparatus further includes a data driving circuit configured to convert image data to a data voltage. The display apparatus additionally includes a driving voltage generator configured to generate a common voltage applied to the common electrode and an analog source voltage applied to the data driving circuit. The display apparatus further includes a data switching circuit configured to output an initial data voltage to the data line during an initial setting period when a power is turned on to the display apparatus. The initial data voltage is either the common voltage, a half voltage of the analog source voltage or a ground voltage. The display apparatus further includes a gate driver configured to output a gate signal to the gate line during the initial setting period.

In an exemplary embodiment of the present inventive concept, the driving voltage generator is configured to provide the data switching circuit with either the half voltage of the analog source voltage or the common voltage.

In an exemplary embodiment of the present inventive concept, the data switching circuit is configured to output the data voltage to the data line during a normal driving period after the initial setting period.

In an exemplary embodiment of the present inventive concept, the liquid crystal layer is driven in a normally black mode.

In an exemplary embodiment of the present inventive concept, either the common electrode or the pixel electrode includes a plurality of lines.

According to an exemplary embodiment of the present inventive concept, a method of driving a display apparatus, which includes a switching element connected to a data line and a gate line, a pixel electrode connected to the switching element, a common electrode facing the pixel electrode and a liquid crystal layer driven by a difference in voltages between a first voltage applied to the pixel electrode and a second voltage applied to the common electrode, is provided. The method includes generating a common voltage applied to the common electrode. The method further includes outputting the common voltage to the data line during an initial setting period when a power is turned on to the display apparatus. The method additionally includes outputting a data voltage corresponding to an image data to the data line during a normal driving period after the initial setting period.

In an exemplary embodiment of the present inventive concept, the common voltage is applied to the pixel electrode and the common electrode during the initial setting period.

In an exemplary embodiment of the present inventive concept, the common voltage is higher than a ground voltage and greater than or less than half of the analog source voltage.

In an exemplary embodiment of the present inventive concept, the gate driver is configured to output the gate signal to the gate line during the initial setting period.

In an exemplary embodiment of the present inventive concept, the method further includes applying the first voltage to the pixel electrode and the second voltage to the common electrode. When the difference in voltage between the first voltage applied to the pixel electrode and the second voltage applied to the common electrode increases, a light transmissivity of the liquid crystal layer increases. When the difference in voltage between the first voltage applied to the pixel electrode and the second voltage applied to the common electrode decreases, the light transmissivity of the liquid crystal layer decreases.

In an exemplary embodiment of the present inventive concept, the liquid crystal layer is driven by a horizontal electric field generated between the common electrode and the pixel electrode.

In an exemplary embodiment of the present inventive concept, either the common electrode or the pixel electrode includes a plurality of lines.

BRIEF DESCRIPTION OF THE DRAWINGS

The above and other features of the present inventive concept will become more apparent by describing, in detail, exemplary embodiments thereof, with reference to the accompanying drawings, in which.

DETAILED DESCRIPTION OF EMBODIMENTS

Hereinafter, exemplary embodiments of the present inventive concept will be described more fully with reference to the accompanying drawings.

Figure 1:
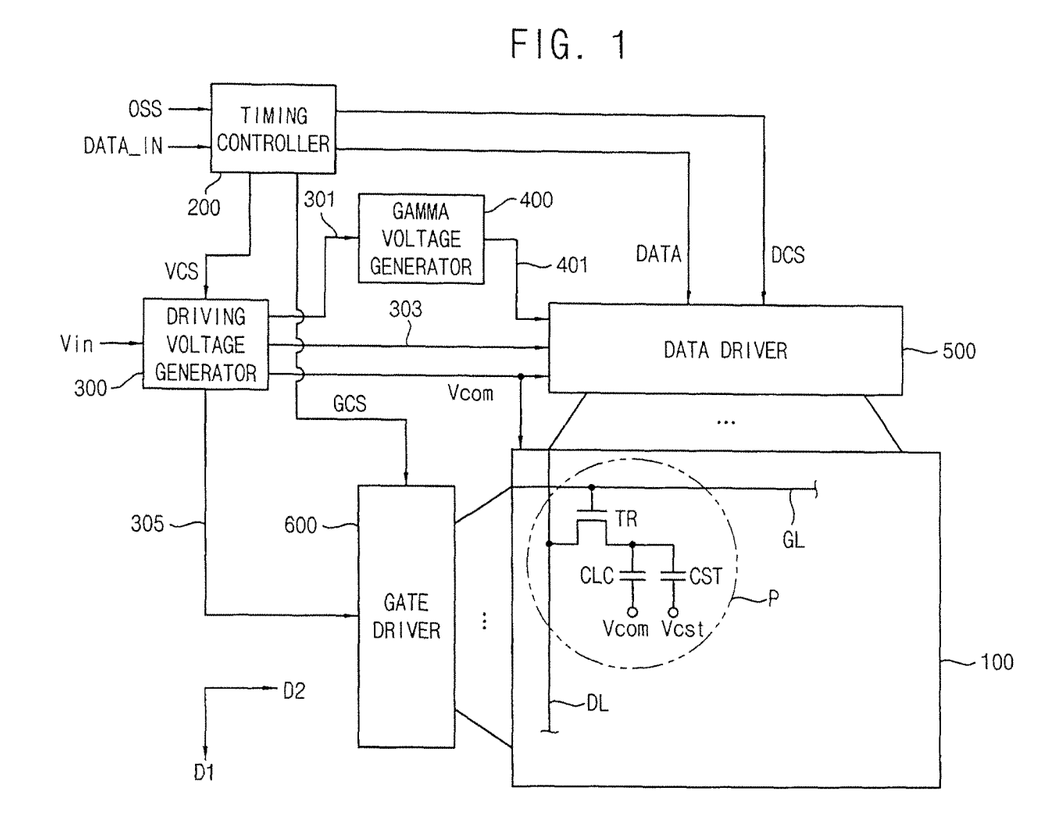
FIG. 1 is a block diagram illustrating a display apparatus according to an exemplary embodiment of the present inventive concept.
Figure 2:
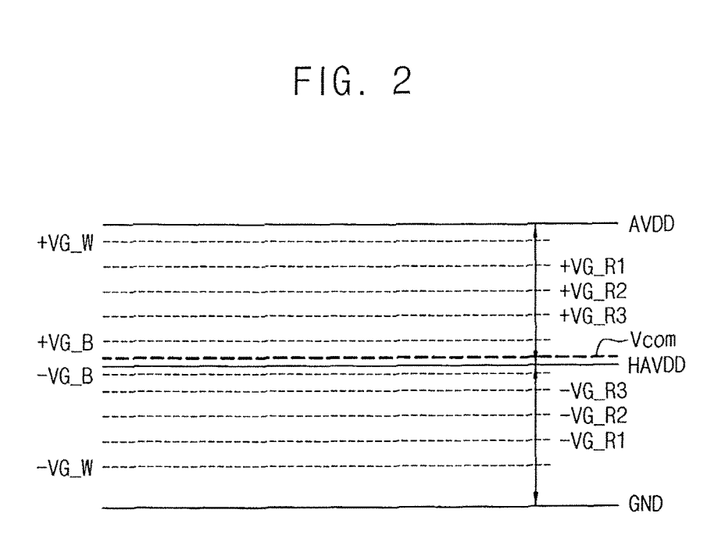
FIG. 2 is a conceptual diagram illustrating a data voltage according to the display apparatus of FIG. 1.

FIG. 1 is a block diagram illustrating a display apparatus according to an exemplary embodiment of the present inventive concept. FIG. 2 is a conceptual diagram illustrating a data voltage according to the display apparatus of FIG. 1.

Referring to FIG. 1, the display apparatus may include a display panel 100, a timing controller 200, a driving voltage generator 300, a gamma voltage generator 400, a data driver 500 and gate driver 600.

The display panel 100 may include a plurality of data lines DL, a plurality of gate lines GL and a plurality of pixels P.

The plurality of data lines DL may extend in a first direction D1, and may be arranged in a second direction D2 crossing (e.g., substantially perpendicular to) the first direction D1. The plurality of gate lines GL may extend in the second direction D2 and may be arranged in the first direction D1. Each pixel of the plurality of pixels P may include a switching element TR (e.g., a thin-film transistor) connected to a data line DL and a gate line GL, a liquid crystal ("LC") capacitor CLC connected to the switching element TR and a storage capacitor CST connected to the LC capacitor CLC. The LC capacitor CLC may include a first electrode receiving a data voltage through the switching element TR and a second electrode receiving a common voltage Vcom. The first electrode of the LC capacitor CLC may be a pixel electrode. The second electrode of the LC capacitor CLC may be a common electrode. The storage capacitor CST may include a first electrode receiving the data voltage and a second electrode receiving a storage common voltage Vcst. The storage common voltage Vcst may be substantially equal to the common voltage Vcom.

The display panel 100 may include a liquid crystal layer driven in a normally black mode in which the display panel 100 displays a black grayscale while a power is off.

The timing controller 200 is configured to generally control operations of the display apparatus. For example, the timing controller 200 may control operations of the driving voltage generator 300, the data driver 500, and the gate driver 600. The timing controller 200 is configured to receive image data DATA_IN and an original synchronization signal OSS from an external device. The original synchronization signal OSS may include a vertical synchronization signal Vsync.

The timing controller 200 is configured to compensate the input image data DATA_IN using various compensation algorithms and to provide the data driver 500 with compensated image data DATA.

The timing controller 200 is configured to generate a display synchronization signal for driving the display apparatus in response to the original synchronization signal OSS. The display synchronization signal may include a voltage control signal VCS for controlling the driving voltage generator 300, a data control signal DCS for controlling the data driver 500 and a gate control signal GCS for controlling the gate driver 600.

According to an exemplary embodiment of the present inventive concept, the timing controller 200 is configured to display a black grayscale on the display panel 100 during an initial setting period when a power is turned on to the display apparatus (e.g., power is applied from a power source). Thus, during the initial setting period, the driving voltage generator 300 provides the data driver 500 and the common electrode of the LC capacitor CLC in the display panel 100 with the common voltage Vcom in response to the voltage control signal VCS provided from the timing controller 200. In addition, the timing controller 200 is configured to drive the data driver 500 and the gate driver 600. During the initial setting period, the data driver 500 is configured to output the common voltage Vcom to the data line, and then, the common voltage Vcom is applied to the pixel electrode of the LC capacitor CLC. Accordingly, the LC capacitor CLC of the display panel 100 displays the black grayscale. The display panel 100 displays a black grayscale during the initial setting period, and thus, a flash noise occurring when the power is turned on may be minimized or eliminated.

The driving voltage generator 300 is configured to generate a plurality of driving voltages for driving the display apparatus via an input voltage Vin. The plurality of driving voltages may include a plurality of reference voltages 301, a plurality of data driving voltages 303, a plurality of gate driving voltages 305, and a common voltage Vcom.

The plurality of reference voltages 301 is applied to the gamma voltage generator 400. The plurality of data driving voltages 303 is applied to the data driver 500. The plurality of gate driving voltages 305 is applied to the gate driver 600. The common voltage Vcom is applied to a common electrode of the display panel 100. The plurality of data driving voltages 303 may include an analog source voltage AVDD for generating the data voltage. The plurality of data driving voltages 303 may additionally include a digital source voltage DVDD for driving logic circuits in the data driver 500.

According to an exemplary embodiment of the present inventive concept, the driving voltage generator 300 is configured to provide the data driver 500 with the common voltage Vcom in response to the voltage control signal VCS.

The gamma voltage generator 400 is configured to generate a plurality of gamma voltages 401 by using the plurality of reference voltages 301. The plurality of gamma voltages 401 is applied to the data driver 500.

Referring to FIG. 2, the gamma voltage generator 400 is configured to generate the plurality of gamma voltages +VG_R1, +VG_R2, +VG_R3, −VG_R1, −VG_R2 and −VG_R3 by using the plurality of reference voltages +VG_W, +VG_B, −VG_W and −VG_B. The gamma voltages +VG_R1, +VG_R2 and +VG_R3 have phases that are opposite to phases of the gamma voltages −VG_R1, −VG_R1 and −VG_R1 with respect to the common voltage Vcom.

Light transmissivity of the display panel 100 in the normally black mode increases when a voltage difference between the common electrode of the LC capacitor CLC and the pixel electrode of the LC capacitor CLC increases, and thus, the display panel 100 displays a high grayscale. However, the light transmissivity of the display panel 100 in the normally black mode decreases when the voltage difference between the common electrode of the LC capacitor CLC and the pixel electrode of the LC capacitor CLC decreases, and thus, the display panel 100 displays a low grayscale. Thus, when the common voltage and the data voltage are the same voltage, the display panel 100 may display a black grayscale.

The data driver 500 is configured to convert the compensated image data DATA or the image data DATA to a data voltage by using the gamma voltage received from the gamma voltage generator 400. The data voltage is applied to a data line DL of the display panel 100. According to an exemplary embodiment of the present inventive concept, the data driver 500 is configured to output the common voltage Vcom as the data voltage to the data line DL during the initial setting period.

The gate driver 600 is configured to generate a plurality of gate signals by using the plurality of gate driving voltages, and to sequentially output the plurality of gate signals to the plurality of gate lines GL. According to an exemplary embodiment of the present inventive concept, the gate driver 600 is configured to drive the plurality of gate lines GL during the initial setting period.

According to an exemplary embodiment of the present inventive concept, during the initial setting period, the common voltage Vcom is applied to the pixel electrode of the LC capacitor CLC and the common electrode of the LC capacitor CLC, and thus, the display panel 100 may display a black grayscale. When the power is turned on, a voltage of the common electrode of the LC capacitor CLC is changed from a ground voltage to the common voltage Vcom. Therefore, the flash noise occurring as a result of a backlight of the display panel receiving power during a change period in which voltage of the common electrode of the LC capacitor CLC is changed from a ground voltage to the common voltage Vcom, may be minimized or eliminated.

Figure 3:
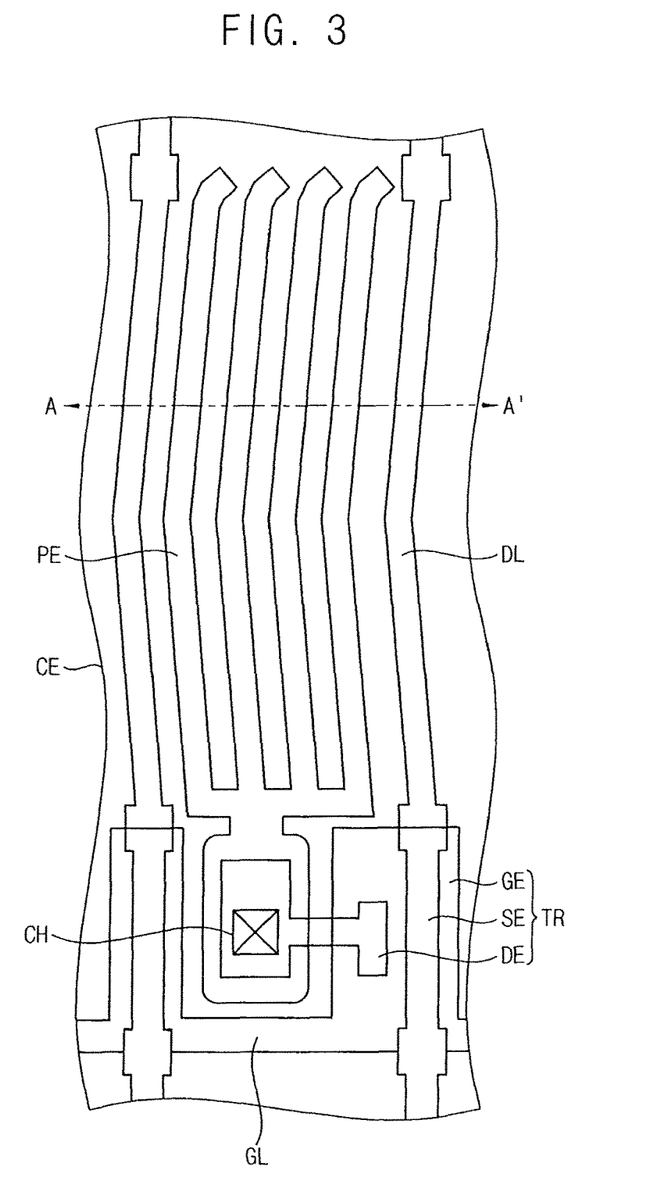
FIG. 3 is a plan view illustrating a display panel of FIG. 1.
Figure 4:
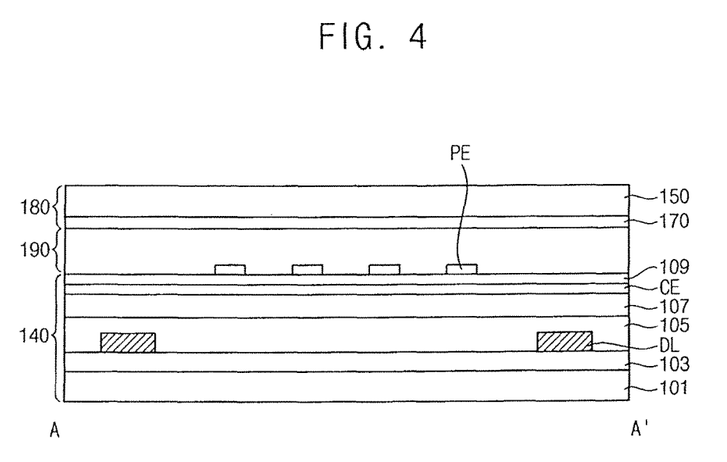
FIG. 4 is a cross-sectional view taken along a line A-A' of FIG. 3.

FIG. 3 is a plan view illustrating a display panel of FIG. 1. FIG. 4 is a cross-sectional view taken along a line A-A' of FIG. 3.

Referring to FIGS. 3 and 4, the display panel 100 may include a first substrate 140, a second substrate 180 and a liquid crystal (LC) layer 190.

The first substrate 140 may include a data line DL extending in a first direction D1 and a gate line GL extending in a second direction D2 crossing the first direction D1 (e.g., as shown in FIG. 1). The gate line GL is connected to a gate electrode GE of a switching element TR. The gate line GL and the gate electrode GE are disposed on a first base substrate 101.

A gate insulating layer 103 is disposed on the first base substrate 101 on which the gate line GL and the gate electrode GE are disposed on. In other words, the gate insulating layer 103 may be disposed above the gate line GL and the gate electrode GE.

The data line DL is connected to a source electrode SE of the switching element TR, which is separated from a drain electrode DE of the switching element TR. The data line DL, the source electrode SE and the drain electrode DE are disposed on the gate insulating layer 103.

A first passivation layer 105 is disposed on the gate insulating layer 103 on which the data line DL, the source electrode SE and the drain electrode DE are disposed on. In other words, the first passivation layer 105 may be disposed on the data line DL, the source electrode SE and the drain electrode DE.

An organic insulating layer 107 is disposed on the first passivation layer 105.

A common electrode CE is disposed on the organic insulating layer 107. The common electrode CE may be formed, without a pattern, as an electrode layer. The common electrode CE may be a second electrode of the LC capacitor CLC and may receive the common voltage Vcom.

A second passivation layer 109 may be disposed on the common electrode CE.

A pixel electrode PE may be disposed on the second passivation layer 109 and includes a plurality of lines. The pixel electrode PE may be formed as an electrode layer that is patterned to have the plurality of lines. Each line of the plurality of lines may be patterned as a line shape. The pixel electrode PE is connected to the drain electrode DE through a contact hole CH. The pixel electrode PE may be the first electrode of the LC capacitor CLC and may receive the data voltage. According to an exemplary embodiment of the present inventive concept, the pixel electrode PE includes the plurality of lines, but exemplary embodiments of the present inventive concept are not limited thereto. For example, the pixel electrode PE may be formed as an electrode layer without being patterned and the common electrode CE may include a plurality of lines. Further, the pixel electrode PE may have an arrangement sequence opposite to an arrangement sequence of the common electrode CE. For example, the common electrode CE may be disposed on the pixel electrode PE.

The second substrate 180 may face the first substrate 140. The second substrate 180 may include a second base substrate 150 facing the first base substrate 101. Further, a color filter layer may be disposed on the second base substrate 150. Alternatively, the color filter layer 170 may be disposed on the first base substrate 101. In addition, the color filter layer 170 may be disposed between the first base substrate 101 and the second base substrate 150. For example, the color filter layer 170 may be disposed between the organic insulating layer 107 and the common electrode CE.

The liquid crystal (LC) layer 190 is disposed between the first and second substrates 140 and 180. The LC layer 190 may control light transmissivity based on a horizontal electric field corresponding to a difference in voltage between the common electrode CE and the pixel electrode PE. According to an exemplary embodiment of the present inventive concept, the liquid crystal layer 190 is driven in a normally black mode and a plane to line switching (PLS) mode.

Figure 5:
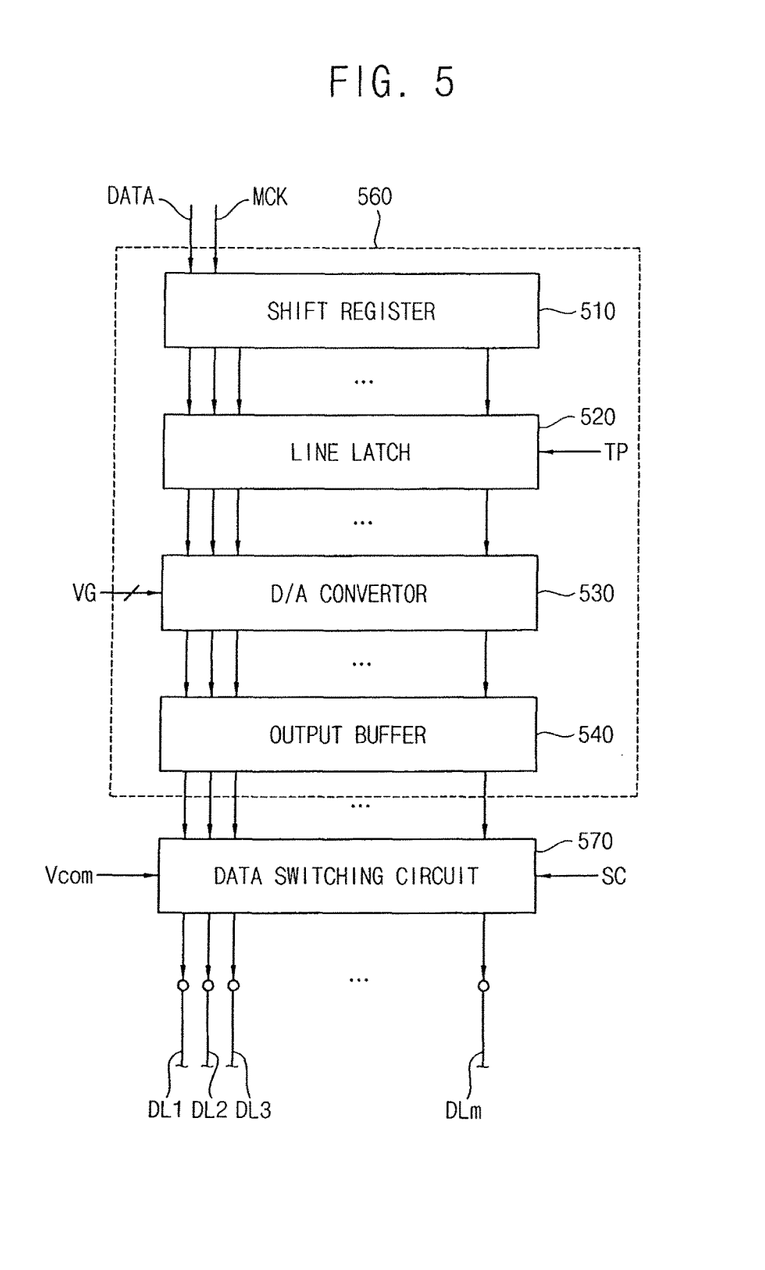
FIG. 5 is a block diagram illustrating a data driver of FIG. 1.
Figure 6:
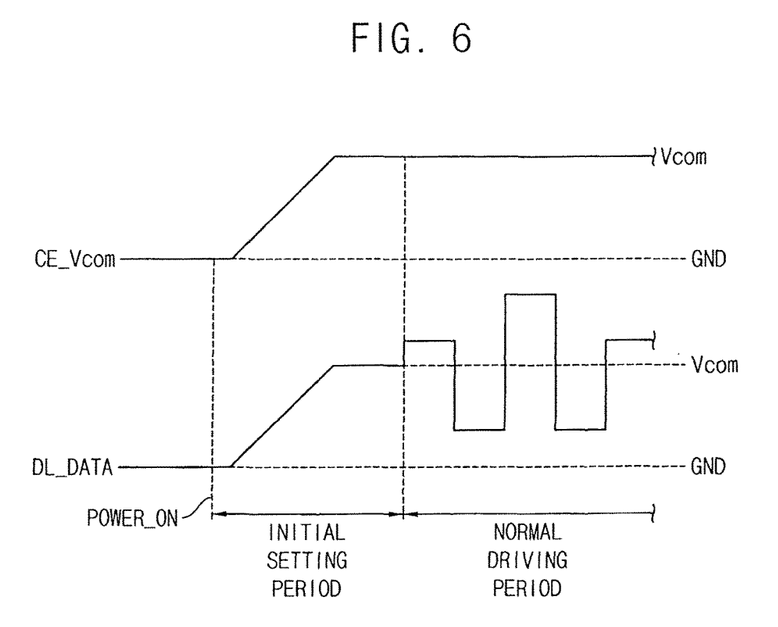
FIG. 6 is a waveform diagram illustrating a method of driving a common electrode and a pixel electrode in an initial setting period according to an exemplary embodiment of the present inventive concept.

FIG. 5 is a block diagram illustrating the data driver 500 of FIG. 1. FIG. 6 is a waveform diagram illustrating a method of driving the common electrode CE and the pixel electrode PE during an initial setting period according to an exemplary embodiment of the present inventive concept.

Referring to FIGS. 5 and 6, the data driver 500 may include a data driving circuit 560 and a data switching circuit 570. The data driving circuit 560 may include a shift register 510, a line latch 520, a digital-analog convertor 530 and an output buffer 540.

The shift register 510 is configured to sequentially store the compensated image data DATA or the image data DATA in response to a clock signal MCK.

The line latch 520 is configured to latch (e.g., store) the image data received by a horizontal line unit of the line latch 520 and provided from the shift register 510, and to output the image data to the digital-analog convertor 530 in response to a load signal TP. For example, the load signal TP may be a data control signal.

The digital-analog convertor 530 is configured to convert the image data to a data voltage by using a received gamma voltage VG.

The output buffer 540 is configured to amplify the data voltage received from the digital-analog convertor 530, and to output the amplified data voltage to the data switching circuit 570.

The data switching circuit 570 is configured to output the amplified data voltage, received from the output buffer 540, or the common voltage Vcom to the data lines DL1, DL2, DL2, . . . , DLm in response to a switching control signal SC received from the timing controller 200 ('m' is a natural number).

Referring to FIG. 6, for example, when the power is turned on to the display apparatus, the data switching circuit 570 is configured to output the common voltage Vcom to the data lines DL1, DL2, DL2, . . . , DLm in response to a switching control signal SC received from the timing controller 200 during an initial setting period (DL_DATA).

During a normal driving period after the initial setting period, the data switching circuit 570 is configured to output a data voltage to a data line of the data lines DL1, DL2, DL2, . . . , DLm in response to the switching control signal SC received from the timing controller 200 (DL_DATA).

In addition, when the power is turned on, the common voltage Vcom is applied to the common electrode of the display panel (CE_Vcom).

The data driving circuit 560 may include the data switching circuit 570. Alternatively, the data switching circuit 570 may be disposed on a printed circuit board or a peripheral area of the display panel 100.

The data switching circuit 570 may be disposed prior to the output buffer 540 and, thus, receive the image data from the digital-analog converter 530. For example, a voltage outputted from the data switching circuit 570 is amplified by the output buffer 540, and then, a voltage outputted from the output buffer 540 may be applied to a data line of the data lines DL1, DL2, DL2, . . . , DLm.

During the initial setting period, the data line and the common electrode may receive a same common voltage Vcom, and thus, the pixel electrode may receive the common voltage Vcom applied to the common electrode. During the initial setting period, the change in voltage from the ground voltage GND to the common voltage Vcom is equal for the common electrode and the pixel electrode. Accordingly, there is no difference in voltage variations between the common electrode and the pixel electrode during the initial setting period.

As described above, both electrodes (the common electrode and the pixel electrode) of the LC capacitor CLC receive a same common voltage Vcom, and thus, the display panel 100 in the normally black mode may display the black grayscale. Accordingly, when the power is turned on, the display panel 100 displays the black grayscale during the initial setting period, and thus, the flash noise occurring because of the backlight may be minimized or eliminated.

Figure 7:
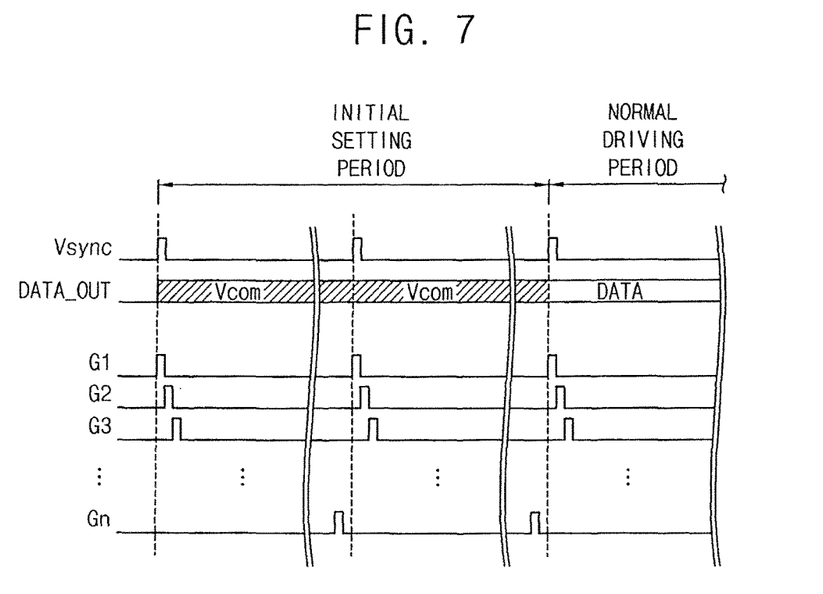
FIG. 7 is a waveform diagram illustrating a method of driving a display apparatus according to an exemplary embodiment of the present inventive concept.
Figure 8:
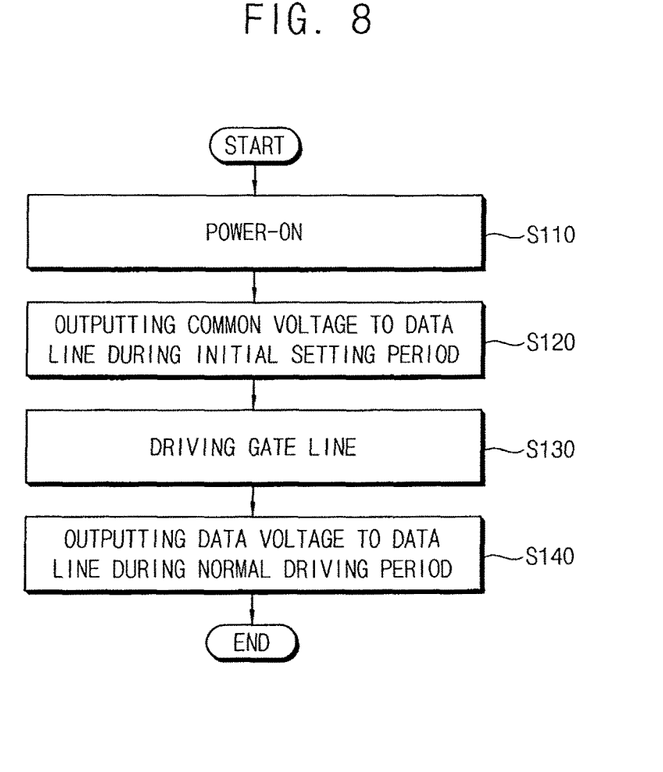
FIG. 8 is a flowchart illustrating a method of driving a display apparatus according to an exemplary embodiment of the present inventive concept.

FIG. 7 is a waveform diagram illustrating a method of driving a display apparatus according to an exemplary embodiment of the present inventive concept. FIG. 8 is a flowchart illustrating a method of driving a display apparatus according to an exemplary embodiment of the present inventive concept.

Referring to FIGS. 1, 5, 7 and 8, when power is turned on (S110), the driving voltage generator 300 is configured to provide the data switching circuit 570 with the common voltage Vcom during the initial setting period. During the initial setting period, the data switching circuit 570 is configured to output the common voltage Vcom to the data lines DL (S120) (e.g., DATA_OUT). Further, driving voltage generator 300 is configured to provide the common voltage Vcom to the common electrode of the display panel 100. During the initial setting period, the gate driver 600 is configured to drive the gate lines GL (S130). Further, the gate driver 600 is configured to output a gate signal G1, G2, G3, . . . , GN to each gate line of the gate lines GL.

During the initial setting period, both electrodes (the common electrode and the pixel electrode) of the LC capacitor CLC in the display panel 100 may receive the same common voltage Vcom. Accordingly, the display panel 100 may display the black grayscale, and thus, the flash noise occurring because of the backlight may be minimized or eliminated.

During the normal driving period after the initial setting period, the data switching circuit 570 is configured to output the data voltage DATA to the data lines DL (S140) (e.g., DATA_OUT). In this case, the data voltage DATA outputted from the data switching circuit 570 may be amplified by the output buffer 540, and the amplified data voltage DATA may be provided to the switching circuit 570. Further, data voltage DATA provided to the data lines DL corresponds to image data provided from the timing controller 200. The driving voltage generator 300 is configured to provide the common electrode of the display panel 100 with the common voltage Vcom. The gate driver 600 is configured to drive the gate lines GL.

During the normal driving period, the display panel 100 may display an image.

According to an exemplary embodiment of the present inventive concept, during the initial setting period, the same common voltage is applied to the pixel electrode and the common electrode of the LC capacitor CLC, and thus, the display panel 100 may display the black grayscale. Therefore, when the power is turned on, the flash noise occurring because of the backlight may be minimized or eliminated.

Figure 9:
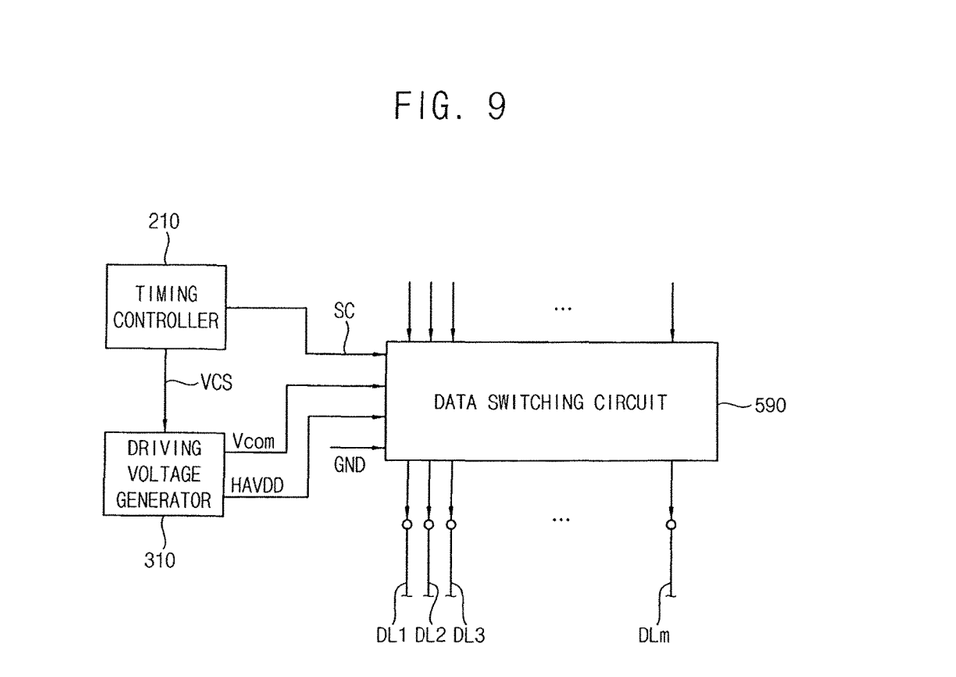
FIG. 9 is a block diagram illustrating a display apparatus according to an exemplary embodiment of the present inventive concept.

FIG. 9 is a block diagram illustrating a display apparatus according to an exemplary embodiment of the present inventive concept.

Referring to FIGS. 1 and 9, the display apparatus may include a timing controller 210, a driving voltage generator 310 and a data switching circuit 590.

The timing controller 210 is configured to control voltages applied to data lines during an initial setting period. Further, the timing controller 210 is configured to provide the driving voltage generator 310 with a voltage control signal VCS which selects either a half source voltage HAVDD, a common voltage Vcom or a ground voltage GND based on characteristic of the display panel 100.

The driving voltage generator 310 is configured to generate a plurality of driving voltages, and the plurality of driving voltages may include the half source voltage HAVDD and the common voltage Vcom. The common voltage Vcom is applied to a common electrode of the display panel 100, and the half source voltage HAVDD is about half of an analog source voltage AVDD, which is applied to the data driving circuit 560. The driving voltage generator 310 is configured to provide the data switching circuit 590 with either the half source voltage HAVDD or the common voltage Vcom in response to a voltage control signal VCS provided by the timing controller 210 during the initial setting period.

When the power is turned on, the data switching circuit 590 is configured to output an initial data voltage, which is either the half source voltage HAVDD, the common voltage Vcom or the ground voltage GND, to the data lines DL1, DL2, DL2, . . . , DLm in response to a control signal SC provided by the timing controller 210.

During a normal driving period after the initial setting period, the data switching circuit 590 is configured to output a data voltage corresponding to image data to the data lines DL1, DL2, DL2, . . . , DLm in response to the control signal SC provided by the timing controller 210.

In addition, when the power is turned on, the common voltage Vcom is applied to a common electrode of the display panel 100.

The data switching circuit 590 may be disposed in the data driving circuit 560. Alternatively, the data switching circuit 590 may be separated from the data driving circuit 560 by being disposed in a printed circuit board or a peripheral area of the display panel 100.

The data switching circuit 590 may be disposed prior to the output buffer 540 and, thus, receive the image data from the digital-analog converter 530. For example, a voltage outputted from the data switching circuit 570 may be subsequently amplified by the output buffer 540 and then, a voltage outputted from the output buffer 540 may be applied to a data line of the data lines DL1, DL2, DL2, . . . , DLm.

As described above, in a display apparatus according to an exemplary embodiment of the present inventive concept, during the initial setting period, a same initial data voltage selected based on characteristic of the display panel is applied to the pixel electrode and the common electrode of the LC capacitor CLC, and thus, the display panel may display the black grayscale. Therefore, when the power is turned on, the flash noise occurring because of the backlight may be minimized or eliminated.

While the present inventive concept has been particularly shown and described with reference to exemplary embodiments thereof, it will be apparent to those of ordinary skill in the art that various changes in form and detail may be made thereto without departing from the spirit and scope of the present inventive concept as defined by the following claims.

What is claimed is:

1. A display apparatus, comprising:
a display panel comprising a switching element connected to a data line and a gate line, a pixel electrode connected to the switching element, a common electrode facing the pixel electrode and a liquid crystal layer disposed between the pixel electrode and the common electrode, the liquid crystal layer driven by a difference in voltages between a voltage applied to the pixel electrode and a voltage applied to the common electrode;
a data driving circuit configured to convert image data to a data voltage;
a driving voltage generator configured to generate a common voltage applied to the common electrode and an analog source voltage applied to the data driving circuit;
a data switching circuit configured to output the common voltage to the data line during an initial setting period when power is turned on to the display apparatus; and
a gate driver configured to generate a plurality of gate signals, and sequentially output the plurality of gate signals to a plurality of gate lines during the initial setting period.

2. The display apparatus of claim 1, wherein the common voltage is applied to the pixel electrode and the common electrode during the initial setting period.

3. The display apparatus of claim 2, wherein the common voltage is higher than a ground voltage and greater than or less than half of the analog source voltage.

4. The display apparatus of claim 1, further comprising a gate driver configured to output a gate signal to the gate line.

5. The display apparatus of claim 1, wherein the data switching circuit is configured to output the data voltage to the data line during a normal driving period after the initial setting period.

6. The display apparatus of claim 1, wherein the liquid crystal layer is driven in a normally black mode.

7. The display apparatus of claim 1, wherein the display panel comprises a first base substrate, a second base substrate facing the first base substrate, and the common electrode and the pixel electrode are disposed on a same base substrate.

8. The display apparatus of claim 1, wherein either the common electrode or the pixel electrode comprises a plurality of lines.

9. A display apparatus, comprising:
a display panel comprising a switching element connected to a data line and a gate line, a pixel electrode connected to the switching element, a common electrode facing the pixel electrode and a liquid crystal layer disposed between the pixel electrode and the common electrode, the liquid crystal layer driven by a difference in voltages between a voltage applied to the pixel electrode and a voltage applied to the common electrode;
a data driving circuit configured to convert image data to a data voltage;
a driving voltage generator configured to generate a common voltage applied to the common electrode and an analog source voltage applied to the data driving circuit;
a data switching circuit configured to output an initial data voltage to the data line during an initial setting period when a power is turned on to the display apparatus, wherein the initial data voltage is either the common voltage, a half voltage of the analog source voltage or a ground voltage; and
a gate driver configured to sequentially output a plurality of gate signals to a plurality of gate lines during the initial setting period.

10. The display apparatus of claim 9, wherein the driving voltage generator is configured to provide the data switching circuit with either the half voltage of the analog source voltage or the common voltage.

11. The display apparatus of claim 9, wherein the data switching circuit is configured to output the data voltage to the data line during a normal driving period after the initial setting period.

12. The display apparatus of claim 9, wherein the liquid crystal layer is driven in a normally black mode.

13. The display apparatus of claim 9, wherein either the common electrode or the pixel electrode comprises a plurality of lines.

14. A method of driving a display apparatus which comprises a switching element connected to a data line and a gate line, a pixel electrode connected to the switching element, a common electrode facing the pixel electrode and a liquid crystal layer driven by a difference in voltages between a first voltage applied to the pixel electrode and a second voltage applied to the common electrode, the method comprising:
generating a common voltage applied to the common electrode;
outputting the common voltage to the data line during an initial setting period when a power is turned on to the display apparatus;
outputting a data voltage corresponding to an image data to the data line during a normal driving period after the initial setting period; and
sequentially outputting a plurality of gate signals to a plurality of gate lines during the initial setting period.

15. The method of claim 14, wherein the common voltage is applied to the pixel electrode and the common electrode during the initial setting period.

16. The method of claim 15, wherein the common voltage is higher than a ground voltage and greater than or less than half of an analog source voltage.

17. The method of claim 14, further comprising:
applying the first voltage to the pixel electrode and the second voltage to the common electrode, wherein when the difference in voltage between the first voltage applied to the pixel electrode and the second voltage applied to the common electrode increases, a light transmissivity of the liquid crystal layer increases, and
when the difference in voltage between the first voltage applied to the pixel electrode and the second voltage applied to the common electrode decreases, the light transmissivity of the liquid crystal layer decreases.

18. The method of claim 14, wherein the liquid crystal layer is driven by a horizontal electric field generated between the common electrode and the pixel electrode.

19. The method of claim 14, wherein either the common electrode or the pixel electrode comprises a plurality of lines.

* * * * *